J. R. CADWELL.
Horse Hay Fork.
No. 45,472.  Patented Dec. 20, 1864.
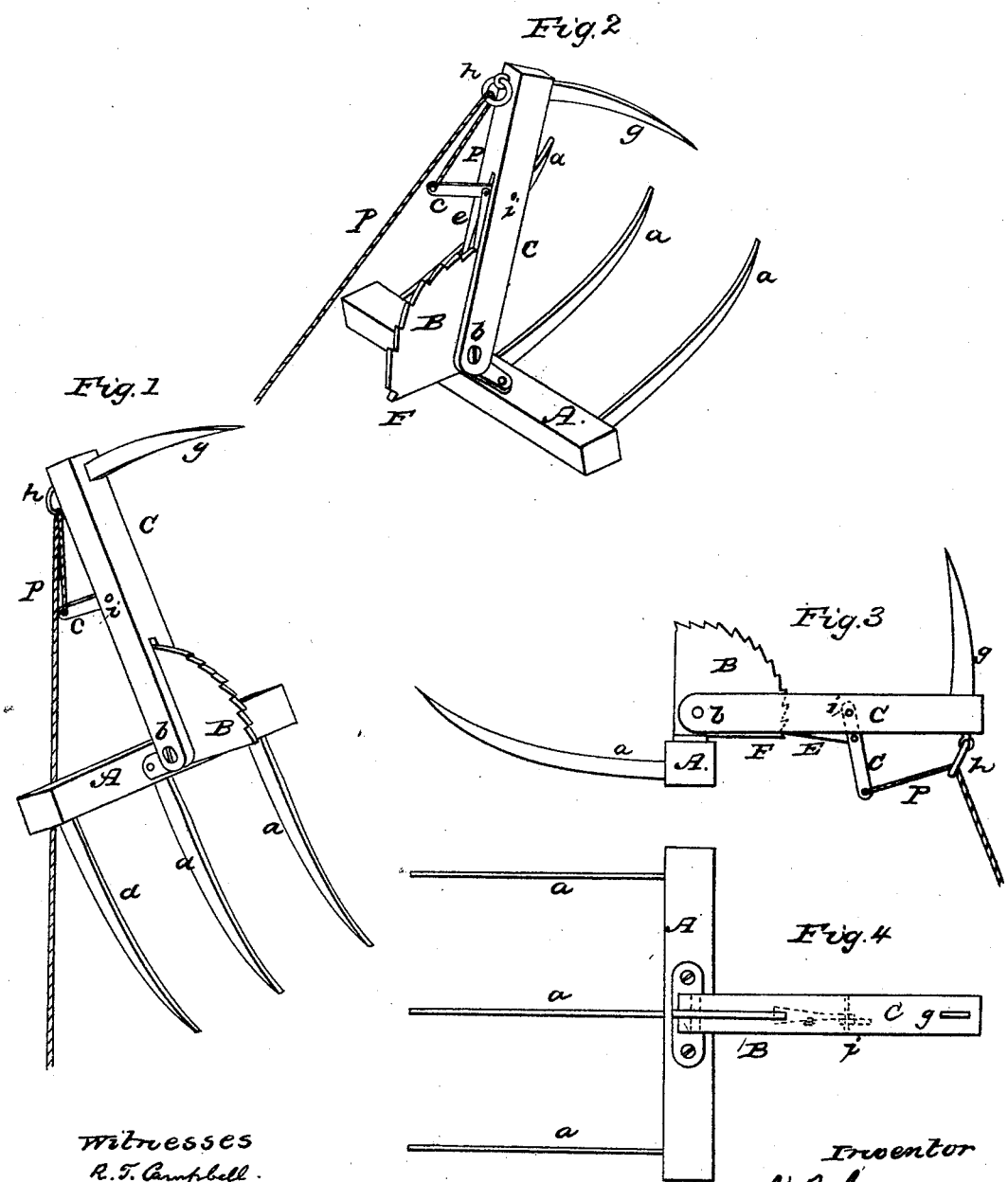

UNITED STATES PATENT OFFICE.

JASON R. CADWELL, OF DEXTER, MICHIGAN.

IMPROVEMENT IN HORSE HAY-FORKS.

Specification forming part of Letters Patent No. 45,472, dated December 20, 1864.

*To all whom it may concern:*

Be it known that I, J. R. CADWELL, of Dexter, Washtenaw county, State of Michigan, have invented a new and Improved Hay-Fork; and I do hereby declare that the following is a full, clear, and exact description thereof, reference being had to the accompanying drawings, making a part of this specification, in which—

Figure 1 is a perspective view of the fork arranged for use as a common hand-fork. Fig. 2 is a perspective view of the same fork arranged for elevating hay. Fig. 3 is a side view of Fig. 1. Fig. 4 is a plan view of the same.

Similar letters of reference indicate corresponding parts in the several figures.

The object of my invention is to so construct a single hand or dung fork that while it will serve every purpose as such it can be readily converted into a double-tined hay-elevating fork, which will answer every purpose of receiving a quantity of hay and grasping it firmly during the elevating operation, and by pulling upon a cord, which is attached to a trip, when the fork is in the desired position the load will be discharged, after which the fork can be drawn down again for elevating and discharging another load, as will be hereinafter described.

To enable others skilled in the art to make and use my invention, I will describe its construction.

In the accompanying drawings, A represents the head of the fork, to which any desirable number of tines $a$ may be secured. I may make these tines and the head to which they are secured entirely of metal, bent into a suitable form; or the tines can be secured into a wooden head, as I have represented in the drawings. On one side of the head A, I secure a plate, B, which is in the form of a segment of a circle, having ratchet or saw teeth cut on its curved edge, and to this plate, near the head A, the handle C is pivoted by a pin, $b$, running through said plate and handle in a direction with the length of the latter. In order to thus apply the handle C, it should be split or slotted, so as to receive the plate B, as I have clearly shown in the several figures of the drawings. The object of notching the curved edge of the plate B is to enable me to secure the handle either in a rigidly fixed position to the head, as shown in Figs. 1, 3, and 4, or to so attach this handle to the plate B at an intermediate point between its ends that the handle cannot slip backward during the operation of elevating a quantity of hay. In order to accomplish this I cut a deep groove into the back part of the handle of the fork and introduce therein one end of a short trip-lever, $c$, which is pivoted to the handle at $i$. To this lever I pivot one end of a tapering catch, $e$, the smallest end of which is intended to catch into the saw-teeth on plate B and prevent the tines $a$ from tilting until this catch is released by drawing the trip-lever upward.

It is desirable to have the handle C perpendicular to the back edge of the fork-head during the operation of gathering a load of hay upon the tines of the fork, and for this purpose a notch, $f$, is cut in the edge of plate B, as shown in Figs. 2 and 3, in the proper position to receive the catch $e$, when the handle is adjusted as above stated.

On the forward side of the handle C, and near its free end, a single tooth, $g$, is secured, the object of which is to assist the handle and the tines $a$ in embracing a load of hay to be elevated upon a wagon or stack. Just back of the tooth $g$ a ring, $h$, is connected to the handle C for the purpose of receiving a cord, which is attached to the outer end of the trip $c$ and passed through said ring. This cord $p$ is of such length as to enable a person to trip the catch $e$ and open or tilt the fork when it is in an elevated position over the stack. The ring $h$ also serves as a means for attaching the elevating-rope to the fork.

As a hay or dung fork the handle C is secured by means of the catch $e$ to the head of the fork, as above described, and the cord $p$ detached. When used for elevating hay upon stacks or wagons the handle C, with its single tooth $g$, is drawn over, as shown in Fig. 2, and the load of hay confined between them and the tines $a$ by means of the catch $e$ and plate B. When the load of hay is elevated and brought in a proper position over the wagon or stack, the attendant draws on cord $p$ and releases the catch $e$ from its plate B, thus allowing the tines $a$ to swing down in a vertical position and discharge their load.

I do not confine my invention to the use of the catch and tripping-lever herein described, as other modes of securing the handle C to the plate B may be used which will answer the purpose just as well as these parts.

If desirable, a short piece may project from the handle C, to be grasped by the hand in using the fork for ordinary purposes; but it will not be found in practice that the single tooth on the handle is materially in the way or inconvenient.

The great object of my invention is to so construct a fork that it may be used as a hand-fork with the handle set in a line with the tines, and also as a double-grasping fork for elevating hay.

Having thus described my invention, what I claim as new, and desire to secure by Letters Patent, is—

1. The combination of the hinged toothed handle C, locking-plate B, and forked head A in such manner that the fork can be used either for elevating hay or as a common dung-fork, at pleasure, substantially as described.

2. Pivoting the handle of a hay-fork to a catch-plate, B, which is affixed to the fork-head, and applying a catch to said handle for fixing it at any desired angle to the tines of the fork, substantially as described.

Witness my hand in matter of my application for a patent for improvement in hay-forks.

JASON R. CADWELL.

Witnesses:
JAMES G. HONEY,
C. HOWELL.